(12) United States Patent
Paquelet

(10) Patent No.: US 7,656,929 B2
(45) Date of Patent: *Feb. 2, 2010

(54) METHOD FOR DEMODULATING UWB PULSE SEQUENCES

(75) Inventor: Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 634 days.

This patent is subject to a terminal disclaimer.

(21) Appl. No.: 10/946,236

(22) Filed: Sep. 22, 2004

(65) Prior Publication Data

US 2005/0105634 A1    May 19, 2005

(30) Foreign Application Priority Data

Oct. 9, 2003    (EP)    .................................. 03292502

(51) Int. Cl.
*H04B 1/00*    (2006.01)
(52) U.S. Cl. ...................................... 375/130
(58) Field of Classification Search ................. 375/130, 375/150, 256, 325, 376; 455/42, 44, 45
See application file for complete search history.

(56) References Cited

U.S. PATENT DOCUMENTS 5,677,927 A * 10/1997 Fullerton et al. ............ 375/130
6,556,621 B1 * 4/2003 Richards et al. ............ 375/150
7,286,599 B1 * 10/2007 Cheah ........................ 375/238
2002/0135815 A1 * 9/2002 Finn .......................... 358/473
2005/0018750 A1 * 1/2005 Foerster et al. ............. 375/130

OTHER PUBLICATIONS

G. Roberto Aiello, et al: 'Ultra-Wideband Wireless Systems', IEEE Microwave Magazine, Jun. 2003, IEEE, USA, vol. 4, No. 2, pp. 36-47.*
U.S. Appl. No. 10/946,249, filed Sep. 22, 2004, Paquelet.
U.S. Appl. No. 10/950,505, filed Sep. 28, 2004, Paquelet.
U.S. Appl. No. 10/998,930, filed Nov. 30, 2004, Paquelet et al.

* cited by examiner

*Primary Examiner*—David C Payne
*Assistant Examiner*—Tanmay K Shah
(74) *Attorney, Agent, or Firm*—Oblon, Spivak, McClelland, Maier & Neustadt, L.L.P.

(57) ABSTRACT

The present invention relates to a method for transmitting data in the form of at least one pulse sequence Tsgk (for k=1 to K). The method according to the invention includes at least one symbol decoding step in the course of which at least one modulation value Pwk representative of an amount of power carried by each pulse sequence Tsgk is computed and compared to at least one predetermined threshold value thk1, thk2 . . . thkM(k). The method according to the invention enables to limit the processing time and power needed for performing the demodulation of a power-modulated UWB signal, since the information carried by such a signal may be recovered by a receiver without said receiver having to map precisely, with respect to time, the received pulse sequences.

12 Claims, 2 Drawing Sheets

METHOD FOR DEMODULATING UWB PULSE SEQUENCES

BACKGROUND OF THE INVENTION

The present invention relates to a method for transmitting data in a telecommunication system including at least one transmitter and one receiver, said transmitter being intended to transmit a signal formed by at least one sequence of Ns pulses over Ns time windows, each pulse being enclosed within a time chip whose position within its relevant time window is defined by a chip number.

Such data transmission methods are currently studied with the aim of assessing the relevance of so-called Ultra-Wide Band telecommunication systems (further referred to as UWB systems). In such a system each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

BRIEF SUMMARY OF THE INVENTION

The above-described signal may form a carrying signal on which information can be encoded by modulation of said carrying signal. The inventors have observed that, because of the shortness of the pulses involved, a precise synchronization with a given pulse sequence will be difficult to perform at the receiver end, so that the chosen modulation scheme should involve as few time-related parameters as possible in order to be cost-efficient.

The present invention thus aims at providing a modulation/demodulation scheme according to which the information carried by pulse sequences may be recovered at the receiver end without said receiver having to map precisely, with respect to time, the received pulse sequences.

Indeed, a method for transmitting data as described in the opening paragraph is characterized according to the invention in that it includes at least one symbol decoding step to be executed at the receiver end, in the course of which symbol decoding step at least one modulation value representative of an amount of power carried by each pulse sequence is computed and compared to at least one predetermined threshold value.

The symbol decoding step according to the invention enables to achieve a demodulation of a modulated UWB symbol in a very straightforward manner, by quantifying the power of the received signal and performing simple comparisons with one or several threshold values, which comparisons are easy to implement. Such a demodulation scheme does not require the receiver to perform a precise mapping, with respect to time, of the received signal, which in turn enables to manufacture adapted receivers at a relatively low cost.

The modulation of the UWB signals to be demodulated by carrying out such a symbol decoding step may result from various modulation schemes.

According to a particular embodiment of the invention, a method as described hereinbefore further includes at least one symbol encoding step to be executed before transmission of said pulse sequence, in the course of which symbol encoding step each pulse sequence is multiplied by an integer value representative of a symbol to be carried by said pulse sequence.

By virtue of this modulation scheme, the information carried by signals transmitted in Ultra-Wide Band telecommunication systems according to the invention will essentially be related to the power carried by these signals, which power is related to the amplitude of the pulses included within such a signal. Such a modulation scheme is easy to implement, which in turn enables to manufacture adapted transmitters at a relatively low cost.

According to a variant of the invention, each signal to be transmitted is constituted by a superimposition of a predetermined number of pulse sequences, each pulse sequence having been subjected to a symbol encoding step and corresponding to one of several sub-bands into which a total bandwidth available for transmission has previously been divided.

This variant of the invention enables to transmit simultaneously several symbols through a same communication channel, and thus to significantly increase the throughput of a telecommunication system in which such a variant of the invention is embodied.

According to one of its hardware-oriented aspects, the invention also relates to a telecommunication system including at least one transmitter and one receiver, said transmitter being intended to transmit a signal formed by at least one pulse sequence of Ns pulses over Ns time windows, each pulse being enclosed within a time chip whose position within its relevant time window is defined by a chip number, system in which the receiver includes symbol decoding means intended to compute at least one modulation value representative of an amount of power carried by each pulse sequence and to compare said modulation value to at least one predetermined threshold value.

According to a particular embodiment of this hardware-related aspect, the transmitter includes symbol encoding means intended to multiply each pulse sequence by an integer value representative of a symbol to be carried by said pulse sequence.

According to a variant of this hardware-related aspect, the transmitter further includes signal combination means intended to receive a predetermined number of pulse sequences, each pulse sequence having been generated by symbol encoding means and corresponding to one of several sub-bands into which a total bandwidth available for transmission has previously been divided, said signal combination means being intended to combine all said pulse sequences into a signal to be transmitted.

According to another of its hardware-oriented aspects, the invention also relates to a device intended to receive a signal formed by at least one sequence of Ns pulses over Ns time windows, each pulse being enclosed within a time chip whose position within its relevant time window is defined by a chip number, which receiver includes symbol decoding means intended to compute at least one modulation value representative of an amount of power carried by each pulse sequence and to compare said modulation value to at least one predetermined threshold value.

According to yet another of its hardware-oriented aspects, the invention also relates to a device intended to transmit a signal formed by at least one sequence of Ns pulses over Ns time windows, each pulse being enclosed within a time chip whose position within its relevant time window is defined by a chip number, which transmitter includes symbol encoding means intended to multiply each pulse sequence by an integer value representative of a symbol to be carried by said pulse sequence.

BRIEF DESCRIPTION OF THE SEVERAL VIEWS OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
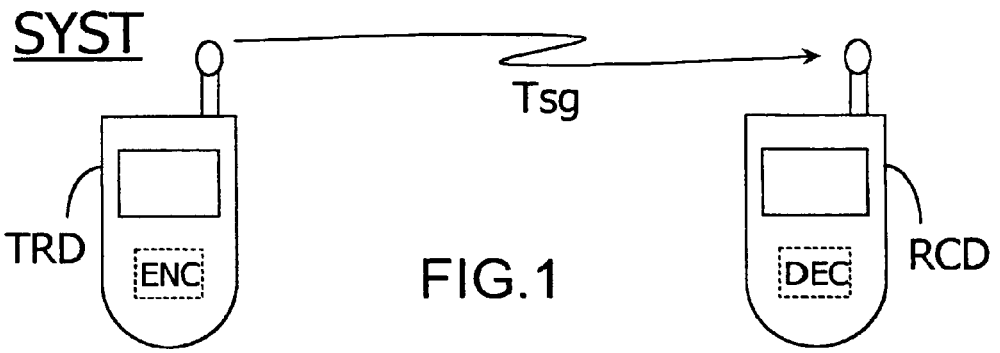
FIG. 1 is a functional diagram depicting a telecommunication system in which the invention is used.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at lest one sequence of Ns pulses pj (for j=1 to Ns) over Ns time windows, each pulse being enclosed within a time chip whose position within its relevant time window is defined by a chip number cj (for j=1 to Ns). The number Ns of pulses included in this sequence may, for example, be chosen equal to 128, while the width of each time window may be chosen equal to 100 nanoseconds, with a width of 1 nanosecond for each time chip.

According to the present invention, the transmitter TRD includes symbol encoding means ENC intended to multiply each pulse sequence by an integer value representative of a symbol to be carried by said pulse sequence.

The information carried by the transmitted signal Tsg will thus essentially be related to the power carried by this signal Tsg, which power is related to the amplitude of the pulses included within said signal Tsg. This information may then be recovered by the receiver RCD without said receiver RCD having to map precisely, with respect to time, the received pulse sequences.

To this end, the receiver RCD includes symbol decoding means DEC intended to compute at least one modulation value representative of an amount of power carried by each pulse sequence and to compare said modulation value to at least one predetermined threshold value. As will be explained hereinafter, the result of such a comparison will automatically point to the demodulated value of the symbol originally encoded within the transmitted signal Tsg by the symbol encoding means ENC.

Figure 2:
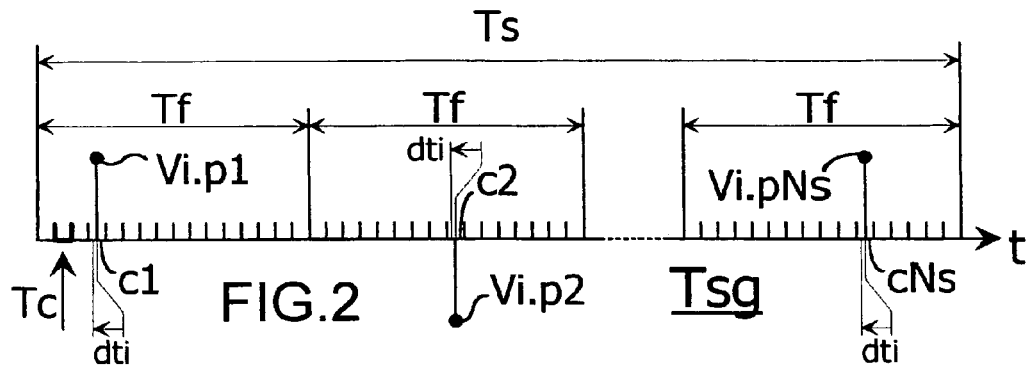
FIG. 2 is a chronogram depicting a pulse sequence constituting a carrying signal transmitted in such a telecommunication system.

FIG. 2 depicts such a transmitted signal Tsg in the form of a chronogram, according to which each pulse sequence has a total duration duration Ts divided into time windows having each a duration Tf, each time window being sub-divided into time chips Tc, a single time chip within each window being intended to enclose a pulse pj (for j=1 to Ns), which single time chip is identified by means of a chip number cj. The transmitter of this transmitted signal Tsg will thus be identified by a signature Sg=(c1, c2 . . . cNs) jointly formed by all above-mentioned chip numbers cj (for j=1 to Ns), which signature Sg is in itself quite sturdy and may thus be reliably and accurately communicated to all potential receivers.

In accordance with the invention, each pulse pj (for j=1 to Ns) belonging to the pulse sequence shown in this picture has been multiplied by a same integer value Vi representative of a symbol to be carried by said pulse sequence, in the form of the power carried by this sequence, the reference "i" being indicative of a reference number allocated to the pulse sequence under consideration.

Furthermore, the pulses pj (for j=1 to Ns) are multiplied by values (j which are randomly chosen equal to +1 or −1 in the course of the symbol encoding step, so that in the example shown here, the second pulse p2 is negative.

Such a random distribution of positive and negative pulses, which does not affect the information carried by said pulses because said information is related to a square form of said pulses, allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications Commission.

All pulses pj (for j=1 to Ns) of the pulse sequence shown here may additionally be submitted to a time jitter dti in the course of the symbol encoding step.

This time-jitter, introduced by time-delaying means, will be kept small with respect to a delay spread induced by a communication channel through which the modulated signal will be transmitted. The delay spread may have, for example, a value of 100 nanoseconds. Such a time-jitter won't affect the information carried by each pulse sequence, and mainly adds an optional degree of flexibility to the modulation scheme according to the invention.

The transmitted signal Tsg may thus be expressed in the following form:

$$Tsg(t) = \sum_{i,j} Vi \cdot \alpha j \cdot pj(t - cj - j \cdot Tf - dti)$$

Figure 3:
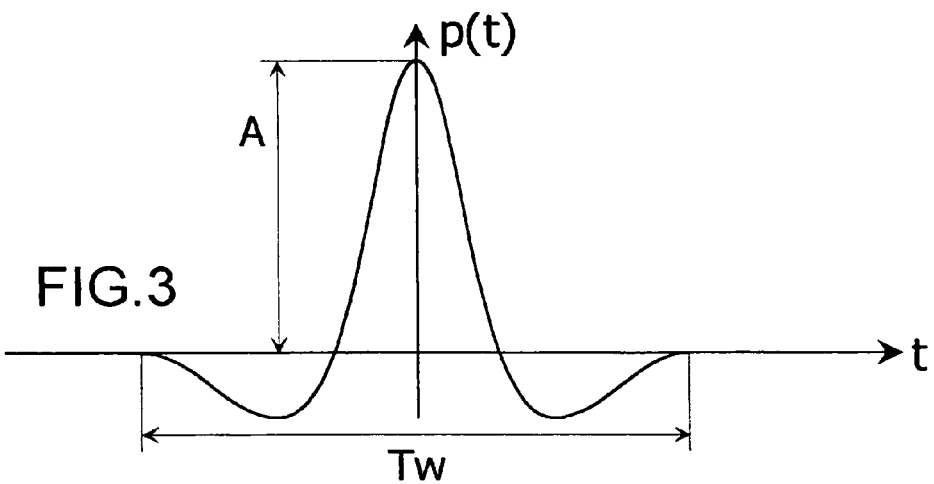
FIG. 3 is a chronogram depicting a pulse model which may be used for generating such a sequence.

FIG. 3 is another chronogram which depicts a possible shape p(t) which may be chosen for constituting the above-mentioned pulses. Pulses pj(t) (for j=1 to Ns) of a same sequence may have different shapes, provided that they all have essentially a same width and carry a same quantity of energy. All pulses pj(t) (for j=1 to Ns) belonging to a same sequence may, however, have a same shape such as the shape p(t) depicted here, which is defined as a derivative of the second order of a Gaussian function, which may be expressed mathematically as $p(t)=A.[1-4\pi(t/Tw)^2].\exp(-2\pi(t/Tw)^2)$. Other pulse shapes known to those skilled in the art may, of course, be used in this same purpose.

Figure 4:
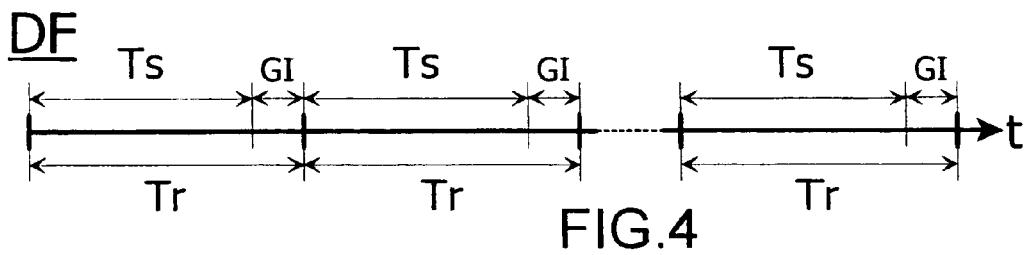
FIG. 4 is a chronogram depicting a data frame including a plurality of pulse sequences.

Fig. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with Tr=Ts+GI, and including each a pulse sequence as described above.

A device intended to receive such a data frame DF must thus only be able to measure quantities representative of the successive amounts of power carried by the successive pulse sequences in order to identify the informational content of the dataframe DF, without having to map precisely, with respect to time, the received pulse sequences.

Figure 5:
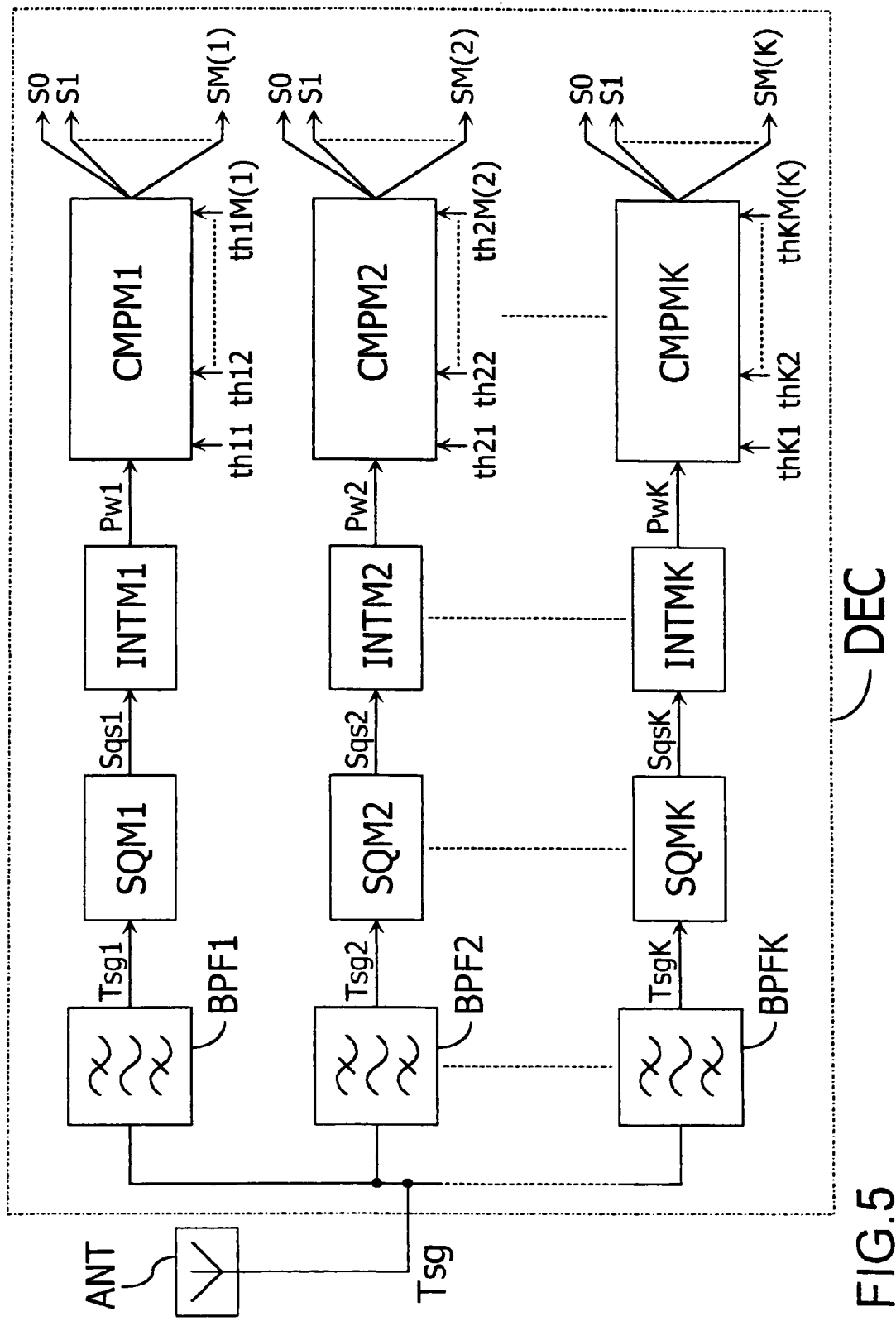
FIG. 5 is a block diagram depicting symbol decoding means included in a receiver in which a variant of the invention is embodied.

FIG. 5 depicts symbol decoding means DEC included in a receiver according to an alternative embodiment of the invention, in which embodiment the transmitted signal Tsg is a composite signal including a combination of K pulse sequences as described hereinbefore, each pulse sequence having thus been subjected to a symbol encoding step at the transmitting end. This receiver includes an antenna device ANT intended to receive such a composite signal Tsg. The decoding means DEC include an array of K band-pass filters PBFk (for k=1 to K) intended to separate from each other K sub-bands into which a total bandwidth used for transmitting the composite signal Tsg has been divided in order to define K different pulse sequences intended each to carry a specific symbol.

This variant of the invention enables to transmit simultaneously several symbols through a same communication channel, and thus to significantly increase the throughput of a telecommunication system in which such a variant of the invention is embodied.

In such an embodiment, each pulse sequence corresponding to a given sub-band of rank k (with k=1 to K) will be expressed as:

$$Tsgk(t) = \sum_{i,j} Vki \cdot \alpha kj \cdot pkj(t - ckj - j \cdot Tf - dtki), \text{ with}$$

$$Tsg(t) = \sum_{k} Tsgk(t)$$

In the embodiment of the invention depicted here, the symbol decoding means DEC include an array of K squaring modules SQMk (with k=1 to K), each of which being connected to one of the band-pass filters BPFk and intended to receive a pulse sequence Tsgk (with k=1 to K) and to deliver a signal Sqsk constituted by a square of said signal Tsgk.

The symbol decoding means DEC further include an array of K integrating modules INTk (with k=1 to K), each of which being connected to one of the squaring modules SQMk and intended to deliver a modulation value Pwk representative of an amount of power carried by the corresponding pulse sequence Tsgk. Such a modulation value Pwk may for example be computed as the integral, on the duration of the channel delay, of the square signal Sqsk delivered by the related squaring module SQMk.

The symbol decoding means DEC also include an array of K comparing modules CMPMk (with k=1 to K), each of which being connected to one of the integrating modules INTk and intended to compare the modulation value Pwk to be delivered by said integrating module INTk with a number M(k) of predetermined threshold values thk1, thk2 ... thkM (k), which number M(k) may be different from one comparing module to another.

The symbol carried by a given pulse sequence Tsk will thus be identified in a very straightforward manner, according to a simple decoding grid which may be expressed as follows:

If Pwk<thk1, then the symbol carried by pulse sequence Tsk is S0;

If thkn<Pwk<thkn+1, then the symbol carried by pulse sequence Tsk is Sn, for n=1 to M(k)−1; and If thkM(k)<Pwk, then the symbol carried by pulse sequence Tsk is SM(k).

Various methods may be used by those skilled in the art for defining and computing the. Such threshold values may for example be defined by considering a linear progression of said values over a whole variation range of the power which could be carried by received signals, said range being then divided into intervals having all essentially a same size and corresponding each to a given encodable symbol.

However, the definition of the predetermined threshold values thk1, thk2 ... thkM(k) should preferably take into account a non-linear processing to be performed in the course of the symbol decoding step, which will involve specific statistical models of unquantifiable parameters such as thermal noise, interference cause by other transceivers, etc.

Each squaring module SQMk may be formed by a Gilbert cell fed with identical input signals. Each integrating module INTk may be formed by an operational amplifier provided with an RC feedback. Each comparing module CMPMk may be formed by an array of M(k) operational amplifiers intended each to receive a same modulation value Pwk and one of the predetermined threshold values thk1, thk2 ... thkM(k) assigned to this comparing module CMPMk. The symbol decoding means DEC may thus be formed by off-the-shelf analog circuits, which analog circuits are known for their high processing speed and do not require any sampling, as opposed to digital solutions, which will enable to further reduce the processing power and the time required for performing a signal decoding step according to this embodiment of the invention.

The invention claimed is:

1. A method for transmitting data in a telecommunication system including at least one transmitter and one receiver, the method comprising:

transmitting, by the transmitter, a signal including a pulse sequence of Ns pulses over Ns time windows, each of the Ns pulses being enclosed within a time chip whose position within a corresponding time window is defined by a chip number and being multiplied by a same integer value representative of a symbol to be carried by said pulse sequence;

computing a modulation value representative of an amount of power related to an amplitude of each of the Ns pulses in the pulse sequence to decode the symbol in the signal; and decoding the symbol in the signal based on a comparison of the modulation value to at least one predetermined threshold value, wherein each signal to be transmitted is constituted by a superimposition of a predetermined number of pulse sequences, each pulse sequence having been multiplied by an integer value representative of a symbol to be carried by the respective pulse sequence and corresponding to one of several sub-bands into which a total bandwidth available for transmission has previously been divided.

2. The method as claimed in claim 1, further comprising:

multiplying, before the transmitting, each of the Ns pulses in the pulse sequence by the same integer value representative of the symbol to be carried by said pulse sequence.

3. A telecommunication system, comprising:

a transmitter configured to transmit a signal including a pulse sequence of Ns pulses over Ns time windows, each of the Ns pulses being enclosed within a time chip whose position within a corresponding time window is defined by a chip number and being multiplied by a same integer value representative of a symbol to be carried by said pulse sequence; and a receiver including symbol decoding means for computing a modulation value representative of an amount of power related to an amplitude of each of the Ns pulses in the pulse sequence to decode the symbol in the signal, and for decoding the symbol in the signal based on a comparison of said modulation value to at least one predetermined threshold value, wherein the transmitter further includes signal combination means for receiving a predetermined number of pulse sequences, each pulse sequence having been multiplied by an integer value representative of a symbol to be carried by the respective pulse sequence and corresponding to one of several sub-bands into which a total bandwidth available for transmission has previously been divided, said signal combination means combining all said pulse sequences into a signal to be transmitted.

4. The telecommunication system as claimed in claim 3, wherein the transmitter includes symbol encoding means for multiplying each of the Ns pulses in the pulse sequence by the same integer value representative of the symbol to be carried by said pulse sequence.

5. A receiver, comprising:

receiving means for receiving a signal including a sequence of Ns pulses over Ns time windows, each of the Ns pulses being enclosed within a time chip whose position within a corresponding time window is defined by a chip number and being multiplied by a same integer value representative of a symbol to be carried by said pulse sequence; and symbol decoding means for computing a modulation value representative of an amount of power related to an amplitude of each of the Ns pulses in the pulse sequence to decode the symbol in the signal, and for decoding the symbol in the signal based on a comparison of said modulation value to at least one predetermined threshold value, wherein the received signal is constituted by a superimposition of a predetermined number of pulse sequences, each pulse sequence having been multiplied by an integer value representative of a symbol to be carried by the respective pulse sequence and corresponding to one of several sub-bands into which a total bandwidth available for transmission has previously been divided.

6. A device for transmitting a signal including a sequence of Ns pulses over Ns time windows, each of the Ns pulses being enclosed within a time chip whose position within a corresponding time window is defined by a chip number, comprising:

symbol encoding means for multiplying each of the Ns pulses in the pulse sequence by a same integer value representative of a symbol to be carried by said pulse sequence, said pulse sequence having an amount of power that is related to an amplitude of each of the Ns pulses in said pulse sequence and that represents the symbol to be carried by said pulse sequence; and signal combination means for receiving a predetermined number of pulse sequences, each pulse sequence having been multiplied by an integer value representative of a symbol to be carried by the respective pulse sequence and corresponding to one of several sub-bands into which a total bandwidth available for transmission has previously been divided, said signal combination means combining all said pulse sequences into a signal to be transmitted.

7. The method as claimed in claim 1, further comprising:

decoding the symbol carried by the pulse sequence based on the comparison and a decoding grid that includes at least one symbol to predetermined threshold relationship.

8. The system as claimed in claim 3, wherein the symbol decoding means decodes the symbol carried by the pulse sequence based on the comparison and a decoding grid that includes at least one symbol to predetermined threshold relationship.

9. The device as claimed in claim 5, wherein the symbol decoding means decodes the symbol carried by the pulse sequence based on the comparison and a decoding grid that includes at least one symbol to predetermined threshold relationship.

10. A telecommunication system, comprising:

a transmitter configured to transmit a signal including a pulse sequence of Ns pulses over Ns time windows, each of the Ns pulses being enclosed within a time chip whose position within a corresponding time window is defined by a chip number and being multiplied by a same integer value representative of a symbol to be carried by said pulse sequence; and a receiver including a symbol decoding unit configured to compute a modulation value representative of an amount of power related to an amplitude of each of the Ns pulses in the pulse sequence to decode the symbol in the signal, and to decode the symbol in the signal based on a comparison of said modulation value to at least one predetermined threshold value, wherein the transmitter further includes a signal combination unit configured to receive a predetermined number of pulse sequences, each pulse sequence having been multiplied by an integer value representative of a symbol to be carried by the respective pulse sequence and corresponding to one of several sub-bands into which a total bandwidth available for transmission has previously been divided, said signal combination unit being configured to combine all said pulse sequences into a signal to be transmitted.

11. A receiver, comprising:

a receiving unit configured to receive a signal including a sequence of Ns pulses over Ns time windows, each of the Ns pulses being enclosed within a time chip whose position within a corresponding time window is defined by a chip number and being multiplied by a same integer value representative of a symbol to be carried by said pulse sequence; and a symbol decoding unit configured to compute a modulation value representative of an amount of power related to an amplitude of each of the Ns pulses in the pulse sequence to decode the symbol in the signal, and to decode the symbol in the signal based on a comparison of said modulation value to at least one predetermined threshold value, wherein the received signal is constituted by a superimposition of a predetermined number of pulse sequences, each pulse sequence having been multiplied by an integer value representative of a symbol to be carried by the respective pulse sequence and corresponding to one of several sub-bands into which a total bandwidth available for transmission has previously been divided.

12. A device for transmitting a signal including a sequence of Ns pulses over Ns time windows, each of the Ns pulses being enclosed within a time chip whose position within a corresponding time window is defined by a chip number, comprising:

a symbol encoding unit configured to multiply each of the Ns pulses in the pulse sequence by a same integer value representative of a symbol to be carried by said pulse sequence, said pulse sequence having an amount of power that is related to an amplitude of each of the Ns pulses in said pulse sequence and that represents the symbol to be carried by said pulse sequence; and a signal combination unit configured to receive a predetermined number of pulse sequences, each pulse sequence having been multiplied by an integer value representative of a symbol to be carried by the respective pulse sequence and corresponding to one of several sub-bands into which a total bandwidth available for transmission has previously been divided, said signal combination unit being configured to combine all said pulse sequences into a signal to be transmitted.

* * * * *